(12) United States Patent
Sullivan et al.

(10) Patent No.: US 10,617,098 B2
(45) Date of Patent: Apr. 14, 2020

(54) LIVESTOCK GROOMING ARTICLE

(71) Applicant: SULLIVAN SUPPLY, INC., Dunlap, IA (US)

(72) Inventors: John Sullivan, Dunlap, IA (US); James Sullivan, Dunlap, IA (US)

(73) Assignee: Sullivan Supply, Inc., Dunlap, IA (US)

( * ) Notice: Subject to any disclaimer, the term of this patent is extended or adjusted under 35 U.S.C. 154(b) by 88 days.

(21) Appl. No.: 15/586,835

(22) Filed: May 4, 2017

(65) Prior Publication Data

US 2017/0318782 A1    Nov. 9, 2017

Related U.S. Application Data

(60) Provisional application No. 62/333,480, filed on May 9, 2016.

(51) Int. Cl.
| | | |
|---|---|---|
| *A01K 13/00* | (2006.01) | |
| *A46B 7/04* | (2006.01) | |
| *A46B 5/02* | (2006.01) | |
| *A46B 9/02* | (2006.01) | |
| *A46D 1/00* | (2006.01) | |

(52) U.S. Cl.
CPC .............. *A01K 13/00* (2013.01); *A46B 5/026* (2013.01); *A46B 7/044* (2013.01); *A46B 9/023* (2013.01); *A46B 9/026* (2013.01); *A46D 1/0284* (2013.01); *A46B 2200/104* (2013.01); *A46B 2200/1093* (2013.01)

(58) Field of Classification Search
CPC .. A46B 7/04; A46B 7/044; A46B 3/22; A46B 7/042; A46B 7/046; A46B 9/023; A01K 13/002; A01K 13/00

USPC .......................................................... D4/134
See application file for complete search history.

(56) References Cited

U.S. PATENT DOCUMENTS

| | | | | |
|---|---|---|---|---|
| 2,227,635 A | | 1/1941 | Dean | |
| 2,963,729 A | | 12/1960 | Thonbo | |
| 4,118,823 A | | 10/1978 | Axelrod | |
| 4,932,425 A | * | 6/1990 | Chen ..................... | A45D 24/42 132/119 |
| 5,005,246 A | * | 4/1991 | Yen-Hui ................. | A46B 7/04 15/111 |
| 5,274,873 A | * | 1/1994 | Shields ................... | A46B 7/04 15/167.1 |

(Continued)

OTHER PUBLICATIONS

Sullivan Supply, "The Stimulating Sensations", vol. 26, p. 33, published Jun. 1, 2016 (2 pages).

*Primary Examiner* — Christopher D Hutchens
(74) *Attorney, Agent, or Firm* — Mueting, Raasch & Gebhardt, P.A.

(57) ABSTRACT

Various embodiments of a livestock grooming article and method of forming same are disclosed. The livestock grooming article includes a handle extending along a handle axis, and a head extending along a head axis and connected to the handle. The head includes a body including a first major surface and a second major surface, and a back slidably connected to the first major surface of the body. The back includes a first major surface and a second major surface, where the first major surface of the back faces the first major surface of the body when the back is connected to the head. The head also includes a bristle extending through the body and beyond the second major surface of the body.

17 Claims, 4 Drawing Sheets

(56) References Cited

U.S. PATENT DOCUMENTS

| | | | |
|---|---|---|---|
| 6,421,872 B1 * | 7/2002 | Sciandivasci | A46B 7/04 15/176.1 |
| 7,159,274 B2 | 1/2007 | Freidell | |
| D777,450 S * | 1/2017 | Sullivan | D4/136 |
| 10,028,574 B2 * | 7/2018 | Rennette | A46B 9/023 |
| 2004/0068816 A1 * | 4/2004 | Kim | A46B 5/0029 15/186 |
| 2006/0265826 A1 * | 11/2006 | Kaminstein | A46B 7/04 15/176.1 |
| 2008/0189890 A1 * | 8/2008 | Arnold | A46B 7/04 15/117 |
| 2015/0047575 A1 * | 2/2015 | Jui-Tsang | A01K 13/002 119/628 |
| 2015/0265040 A1 * | 9/2015 | Huybreckx | A46B 7/044 15/146 |
| 2016/0353855 A1 * | 12/2016 | Rennette | A45D 20/52 |
| 2017/0112271 A1 * | 4/2017 | Gulamani | A46B 9/023 |

\* cited by examiner

LIVESTOCK GROOMING ARTICLE

CROSS-REFERENCE

This application claims the benefit of U.S. Provisional Application Ser. No. 62/333,480, filed May 9, 2016, which is incorporated herein by reference in its entirety.

BACKGROUND

Various tools and articles can be utilized to groom or brush human or animal hair. Such tools and articles include combs and brushes that typically include a plurality of tines or bristles that extend from a head that is attached to a handle. Brushing hair can smooth hair cuticles and redistribute oils from the scalp throughout the hair. Such redistribution of these scalp oils can add body and sheen to the hair and keep hair healthier. A user can groom hair by pulling or pushing the tines through the hair.

There exists a specialized industry for grooming hair of livestock, including but not limited to, cattle, sheep, goats, swine, horses, etc. When livestock are shown in competition or brought to auction, the owners of the livestock often desire that an animal be groomed in a style or manner that creates the appearance of greater volume, such as styles that cause the hair to stand on end, adding localized bulk to the appearance of the animal. Often the appearance of added volume is desired in the leg area, etc. Grooming livestock is different from grooming other animals and requires grooming tools having increased strength and durability due to the hair and hide characteristics of the livestock and the environment to which livestock are exposed. Such environments can be dirty, dusty, wet, muddy, hay-filled and/or windy. Accordingly, specialized tools and methods are desirable in these applications.

SUMMARY

In general, the present disclosure provides various embodiments of a livestock grooming article and a method of forming such article. In one or more embodiments, the livestock grooming article can include a handle and a head connected to the handle. The head can include a body and a back that is slidably connected to a first major surface of the body. The head can also include one or more bristles that extend through the body of the head and beyond a second major surface of the body. In one or more embodiments, the head can be adapted such that the bristle can be removed from the head when the back is at least partially removed from the body.

In one aspect, the present disclosure provides a livestock grooming article that includes a handle extending along a handle axis, and a head extending along a head axis and connected to the handle. The head includes a body including a first major surface and a second major surface, and a back slidably connected to the first major surface of the body. The back includes a first major surface and a second major surface, where the first major surface of the back faces the first major surface of the body when the back is connected to the head. The head also includes a bristle extending through the body and beyond the second major surface of the body.

In another aspect, the present disclosure provides a method of forming a livestock grooming article. The method includes forming a handle that extends along a handle axis, and connecting a head to the handle, where the head extends along a head axis. The method further includes forming a channel through a body of the head, where the channel extends between a first major surface of the body and a second major surface of the body; inserting a bristle through the channel such that the bristle extends through the body and beyond the second major surface of the body; and slidably connecting a back to the first major surface of the body.

All headings provided herein are for the convenience of the reader and should not be used to limit the meaning of any text that follows the heading, unless so specified.

The terms "comprises" and variations thereof do not have a limiting meaning where these terms appear in the description and claims. Such terms will be understood to imply the inclusion of a stated step or element or group of steps or elements but not the exclusion of any other step or element or group of steps or elements.

The words "preferred" and "preferably" refer to embodiments of the disclosure that may afford certain benefits, under certain circumstances; however, other embodiments may also be preferred, under the same or other circumstances. Furthermore, the recitation of one or more preferred embodiments does not imply that other embodiments are not useful, and is not intended to exclude other embodiments from the scope of the disclosure.

In this application, terms such as "a," "an," and "the" are not intended to refer to only a singular entity, but include the general class of which a specific example may be used for illustration. The terms "a," "an," and "the" are used interchangeably with the term "at least one." The phrases "at least one of" and "comprises at least one of" followed by a list refers to any one of the items in the list and any combination of two or more items in the list.

The phrases "at least one of" and "comprises at least one of" followed by a list refers to any one of the items in the list and any combination of two or more items in the list.

As used herein, the term "or" is generally employed in its usual sense including "and/or" unless the content clearly dictates otherwise.

The term "and/or" means one or all of the listed elements or a combination of any two or more of the listed elements.

As used herein in connection with a measured quantity, the term "about" refers to that variation in the measured quantity as would be expected by the skilled artisan making the measurement and exercising a level of care commensurate with the objective of the measurement and the precision of the measuring equipment used. Herein, "up to" a number (e.g., up to 50) includes the number (e.g., 50).

Also herein, the recitations of numerical ranges by endpoints include all numbers subsumed within that range as well as the endpoints (e.g., 1 to 5 includes 1, 1.5, 2, 2.75, 3, 3.80, 4, 5, etc.).

These and other aspects of the present disclosure will be apparent from the detailed description below. In no event, however, should the above summaries be construed as limitations on the claimed subject matter, which subject matter is defined solely by the attached claims, as may be amended during prosecution.

BRIEF DESCRIPTION OF THE DRAWINGS

Throughout the specification, reference is made to the appended drawings, where like reference numerals designate like elements, and wherein.

DETAILED DESCRIPTION

Figure 1:
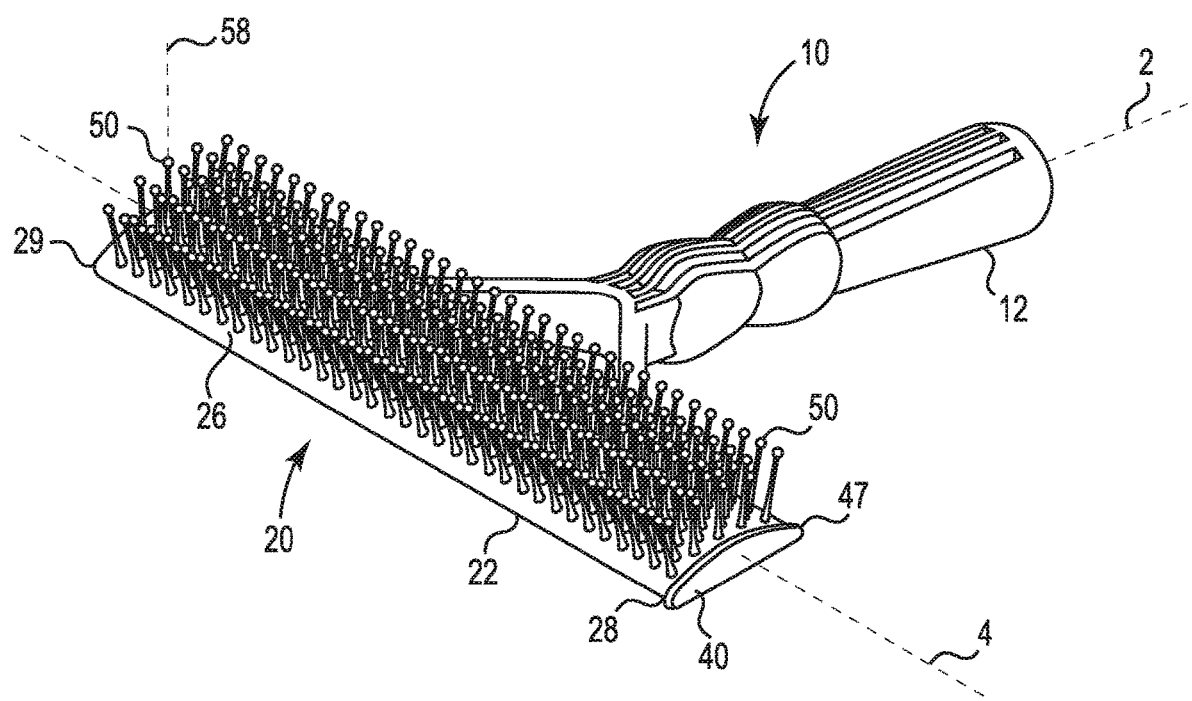
FIG. 1 is a schematic top perspective view of one embodiment of a livestock grooming article with a head of the article in a closed configuration.

In general, the present disclosure provides various embodiments of a livestock grooming article and a method of forming such article. In one or more embodiments, the livestock grooming article can include a handle and a head connected to the handle. The head can include a body and a back that is slidably connected to a first major surface of the body. The head can also include one or more bristles that extend through the body of the head and beyond a second major surface of the body. In one or more embodiments, the head can be adapted such that the bristle can be removed from the head when the back is at least partially removed from the body.

One or more embodiments of livestock grooming articles described herein can provide various advantages. For example, in one or more embodiments, the back of the head of the brush can be at least partially removed from the head such that one or more bristles that extend through the body of the head can be replaced if such bristles become damaged or broken. Further, one or more embodiments of grooming articles described herein can be formed or assembled by inserting bristles into the head and connecting the back to the head by sliding the back into one or more slots formed in the head. Such assembly techniques can simplify the manufacturing process by separately forming or molding bristles and the head as opposed to molding the bristles and head together in one integral step.

FIGS. 1-7 are various views of one embodiment of a livestock grooming article 10. Although described in regard to an article for grooming livestock, the various embodiments of the livestock grooming article 10 can be utilized for grooming pets, humans, or any suitable object. The article 10 includes a handle 12 that extends along a handle axis 2, and a head 20 that extends along a head axis 4. The head 20 is connected to the handle 10. The head 20 includes a body 22 that has a first major surface 24 (FIG. 4) and a second major surface 26, a back 40 connected to the first major surface 24 of the body, and one or more bristles 50 that extend through the body and beyond the second major surface 26 of the body. Further, in one or more embodiments, the head 20 can be adapted such that one or more of the bristles 50 can be removed from the head 20 when the back 40 is at least partially removed from the body 22 as shown in FIGS. 2-5.

The handle 12 can include any suitable handle. Further, the handle 12 can take any suitable shape or combination of shapes and have any suitable dimensions. In one or more embodiments, the handle 12 can take an ergonomic shape that is adapted to be grasped by a hand of a user. The handle 12 can extend between a first end 14 and a second end 16 (FIG. 3) any suitable length along the handle axis 2.

The handle 12 can include one or more grooves 19 (FIG. 3) or textured portions that aid the user in grasping the handle and holding the grooming article 10. In one or more embodiments, the handle 12 can include a sleeve or wrap that can be disposed on a portion of the handle that provides a gripping surface. For example, a textured material can be inserted over a portion of the handle 12 and heated such that the material shrinks to fit the handle and remains attached to the handle.

The handle 12 can include any suitable material or combination of materials, e.g., at least one of a metallic, polymeric, wood, glass or other inorganic material. In one or more embodiments, the handle 12 includes the same material or combination materials as the materials utilized for the head 20. In one or more embodiments, the handle 12 includes a material or combination materials different from the materials utilized for the head 20. Further, the handle 12 can be manufactured using any suitable technique or combination of techniques.

Figure 2:
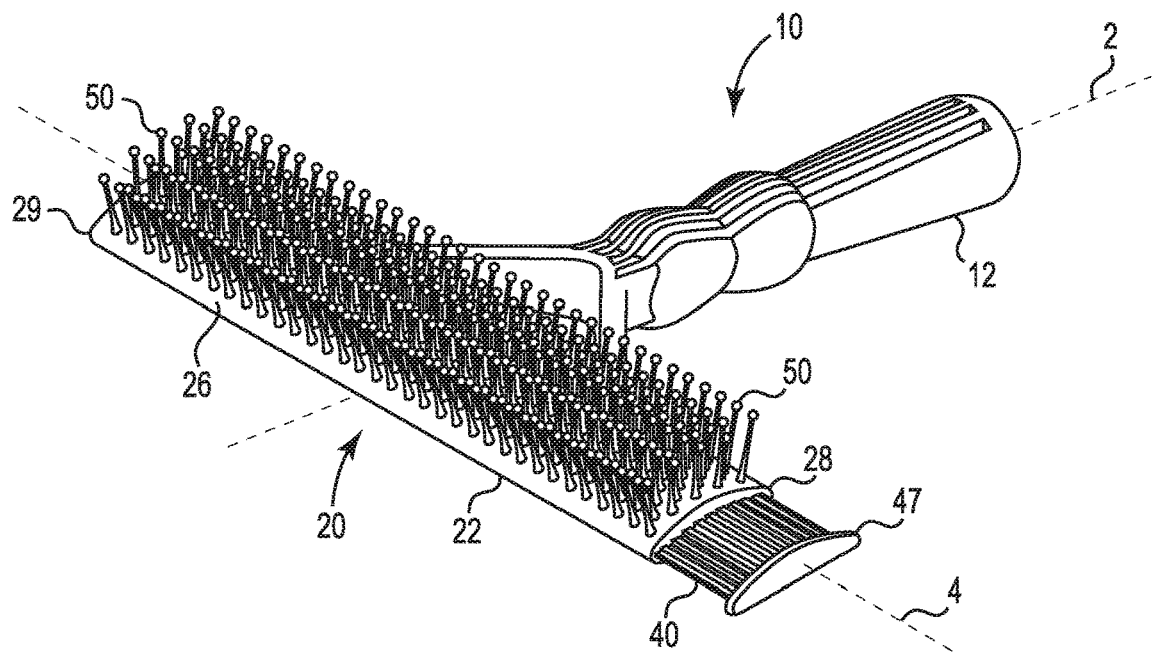
FIG. 2 is a schematic top perspective view of the livestock grooming article of FIG. 1 with the head of the article in a partially open configuration.
Figure 3:
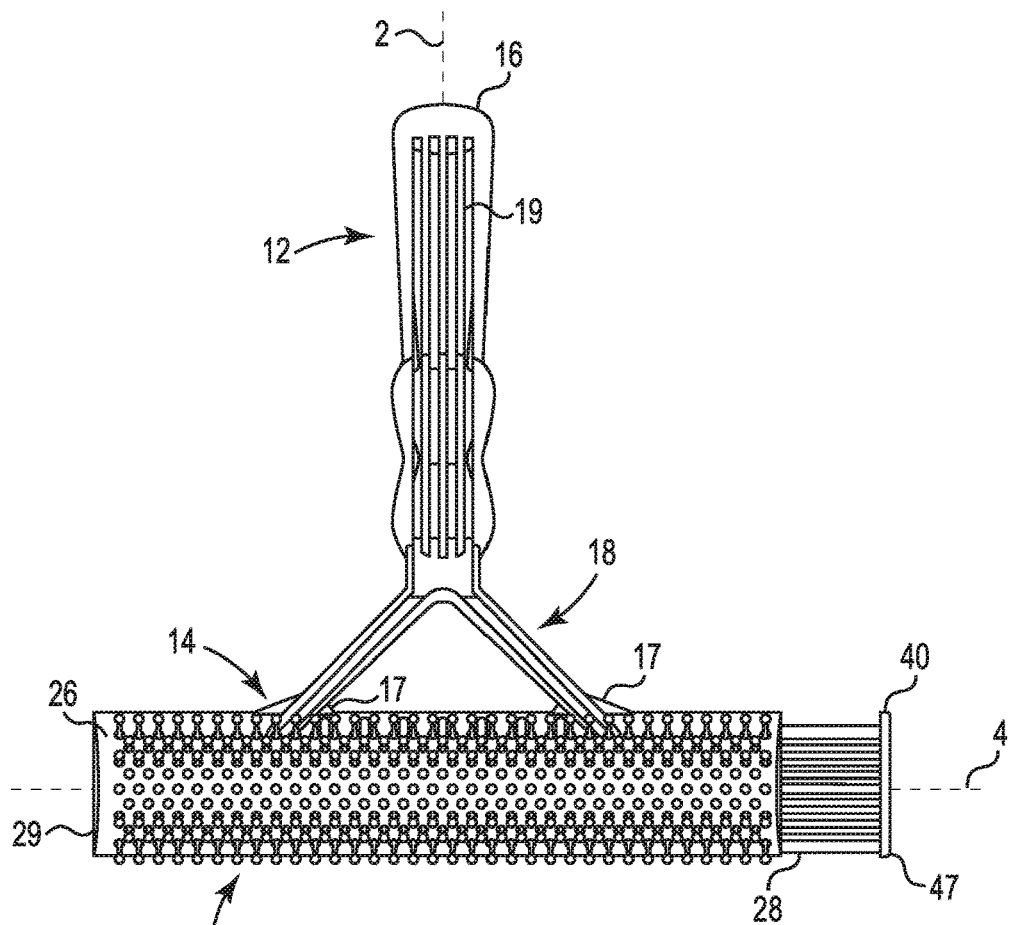
FIG. 3 is a schematic top plan view of the livestock grooming article of FIG. 2.

The handle 12 can be connected to the head 20 using any suitable technique or combination of techniques. For example, the handle 12 can be connected to the body 22 of the head 20 at one or more attachment points 17 (FIG. 3). For example, in the embodiment illustrated in FIGS. 1-7, the handle 12 includes a Y-portion 18 that is connected to the body 22 of the head 20 at attachment points 17. Further, the handle 12 can be connected to the head 20 at any suitable location along the body 22. The handle 12 can be connected to the head 20 using, e.g., mechanical fasteners, adhesives, melt bonding, etc. In one or more embodiments, the handle 12 is integral with the body 22 of the head 20, i.e., the handle and the body are a single piece that are manufactured together and not made separately.

The handle 12 can be connected to the head 20 such that the handle axis 2 forms any suitable angle with the head axis 4. In one or more embodiments, the handle axis 2 can be substantially orthogonal to the head axis 4. As used herein, the term "substantially orthogonal" means that an angle formed between the handle axis 2 and the head axis 4 is equal to at least 80 degrees and no greater than 110 degrees. Further, in one or more embodiments, the handle 12 can be connected to the head 20 such that the handle axis 2 is substantially orthogonal to the head axis 4 and to a bristle axis 58 of one or more bristles 50. Such embodiments can provide ergonomically favorable geometry for grooming livestock, thereby allowing the user to easily pull the bristles through hair of an animal and to easily reach both high and low locations on the animal's body.

Figure 7:
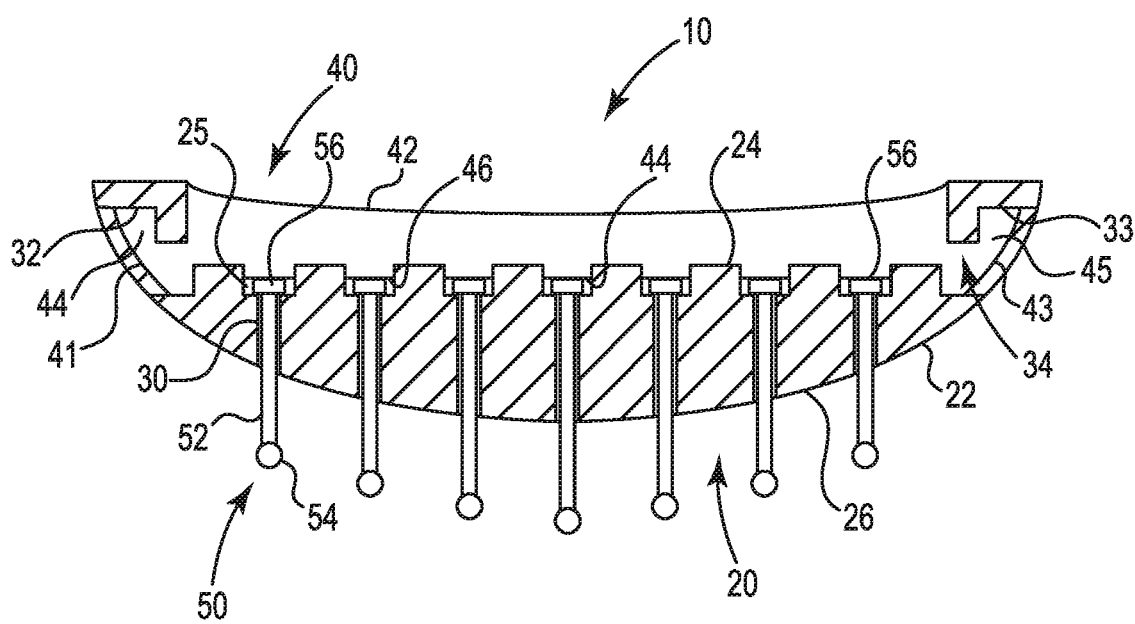
FIG. 7 is a schematic cross-section view of the head of the livestock grooming article of FIG. 1.

The head 20 extends along the head axis 4 and includes the first major surface 24 and the second major surface 26. The first major surface 24 can take any suitable shape or combination of shapes. For example, as illustrated in FIG. 7, which is a cross-section view of the head 20 of the livestock grooming article of FIG. 1, the first major surface 24 can include a cavity 34 that is adapted to receive the back 40. Further, the second major surface 26 can take any suitable shape or combination of shapes. In one or more embodiments, the second major surface 26 includes a curved shape in a plane orthogonal to the head axis 4 (i.e., orthogonal to the plane of FIG. 7). In one or more embodiments, the body 22 can have the same cross-sectional shape along the head axis 4. In one or more embodiments, the cross-sectional shape of the body 22 can change along the head axis 4.

The body 22 of the head 20 can include any suitable material or combination of materials, e.g., at least one of a metallic, polymeric, wood, glass, or other inorganic material. Further, the body 22 can be manufactured using any suitable technique or combination of techniques. The body 22 can also include any suitable dimension or dimensions. For example, the body 22 can have a constant width as measured in a direction orthogonal to the head axis 4 and parallel to the handle axis 2. In one or more embodiments, the body 22 can have a width that varies along the head axis 4. The body 22 extends between a first end 28 and a second end 29 (FIG. 1) and can have any suitable length between the first end and the second end.

The body 22 can also include one or more channels 30 (FIG. 7) that extend between the first major surface 24 and second major surface 26. The channels 30 can have any suitable cross-sectional shape and dimension. In one or more embodiments, one or more channels 30 are adapted such that a bristle 50 can be inserted into the channel from the first major surface 24 of the body 22 and extend through the body and through the channel until the bristle extends any suitable distance beyond the second major surface 26 of the body.

The article 10 also includes the back 40 that is connected to the first major surface 24 of the body 22. The back 40 can be connected to the first major surface 24 the body 22 using any suitable technique or combination of techniques. In one or more embodiments, the back 40 is removably connected to the first major surface 24 of the body 22 such that the back can be at least partially removed from the head 20. Further, in one or more embodiments, the back 40 is slidably connected to the first major surface 24 of the body 22. For example, in one or more embodiments, the first major surface 24 of the body 22 includes a slot 32 that is adapted to receive a tab 44 of the back 40 that is disposed on an edge 41 of the back as can be seen in FIG. 7. In one or more embodiments, an additional tab 45 can be disposed on a second edge 43 of the back 40 such that it engages an additional slot 33 of the body 20.

As mentioned herein, the back 40 can be slidably connected to the body 22 of the head 20. For example, as illustrated in FIGS. 1-2, the back 40 can be slid in a direction parallel to the head axis 4 between a closed configuration (FIG. 1) where a first end 47 of the back is adjacent to or in contact with the first end 28 of the body 20, and a partially open configuration (FIG. 2), where the back 40 is slid in a direction away from the body along the head axis 4 such that the first end of the back is no longer in contact with the first end of the body. As shown in FIG. 2, the back 40 has been directed away from the first end 28 of the body 22 such that the head 20 is in a partially open configuration. In one or more embodiments, the back 40 can be slid away from the body 22 of the head 20 such that the back is no longer connected to the body, i.e., the back can be removed from the head such that the head is in an open configuration. In one or more embodiments, the back 40 can be reconnected to the head 20, e.g., by inserting tabs 44, 45 of the back 40 into slots 32, 33 of the body 22 and sliding the back along the head axis 4 until the first end 47 of the back is adjacent to or in contact with the first end 28 of the body.

In one or more embodiments, the first end 47 of the back 40 can include a stop or protuberance that is adapted to engage the first end 28 of the body 22 such that the back does not continue to slide in a direction toward the second end 29 of the body. This stop or protuberance can be formed such that the end 47 of the back 40 is flush with the first and second major surfaces 24, 26 of the body 22. Further, the body 22 can also include a lip 27 adjacent the second end 29 that can engage a second end 49 of the back 40 to prevent the back from sliding beyond the second end of the body. The lip 27 (FIG. 5) adjacent the second end 29 of the body 22 can be formed such that it is flush with the second end 49 of the back 40 when the back is connected to the body. In one or more embodiments, the back 40 can be permanently connected to the body 20 after the back has been slidably connected to the body such that the back is no longer removable from the body. Any suitable technique or combination of techniques can be utilized to permanently connect the back 40 to the body 20, e.g., adhesives, thermal bonding, ultrasonic bonding, etc.

The back 40 can take any suitable shape or combination of shapes. For example, as shown in FIG. 7, a first major surface 42 of the back 40 can have a concave shape in a plane orthogonal to the head axis 4. In one or more embodiments, the first major surface 42 of the back 40 can take a linear shape in a plane normal to the head axis 4.

The head 20 also includes one or more bristles 50 that extend through the body 22 and beyond the second major surface 26 of the body. The livestock grooming article 10 can include any suitable number of bristles. Further, each bristle 50 can take any suitable shape or combination of shapes and have any suitable dimensions. In one or more embodiments, the bristles 50 can each have the same shape and dimensions. In one or more embodiments, one or more bristles 50 can have a shape that is different from a shape of one or more additional bristles. The bristles 50 can include any suitable material or combination of materials. In one or more embodiments, one or more bristles 50 can include a resilient material such that the bristles are allowed to flex or bend and return to their original configurations.

Figure 6:
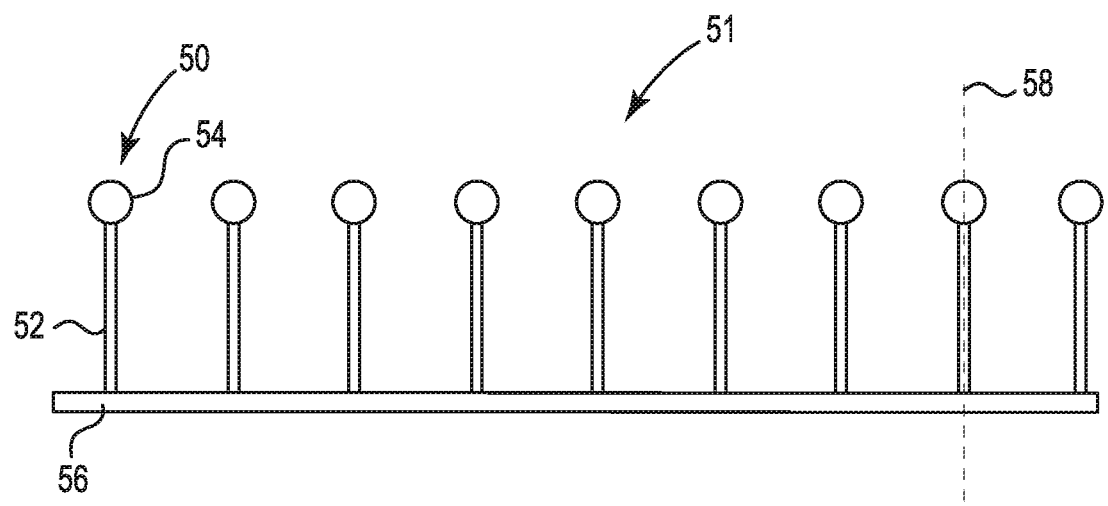
FIG. 6 is a schematic side view of a row of bristles that can be utilized with the livestock grooming article of FIG. 1.

Each bristle 50 can include a base 56, a tip 54, and an elongated portion 52 that extends between the base of the tip along an undeflected bristle axis 58 as shown in FIGS. 6-7. As used herein, the term "undeflected axis" refers to an axis along which the bristle extends when the bristle is in its undeflected configuration. The elongated portion 52 can have any suitable cross-sectional shape, e.g., elliptical, rectilinear, triangular, etc. Although depicted as extending along the bristle axis 58, in one or more embodiments, the elongated portion 52 of one or more bristles 50 can have any suitable shape. For example, in one or more embodiments, the elongated portion 52 can include one or more bends or curves such that the bristle does not extend along an axis. Further, the tip 54 can include any suitable shape or combination of shapes. In one or more embodiments, the tip 54 can include a rounded surface. Further, in one or more embodiments, the tip 54 can include a ball tip.

Each of the bristles 50 can have any suitable length and diameter. In one or more embodiments, the bristles 50 can have substantially equal lengths. Further, in one or more embodiments the bristles 50 can have substantially equal diameters. In one or more embodiments, one or more of the bristles 50 can have a diameter that varies along the bristle axis 58. For example, one or more bristles 50 can have a generally conical shape such that the diameter varies along the bristle axis 58. Further, the bristles 50 can be spaced apart from each other any suitable distance. In one or more embodiments, the bristles may be regularly spaced or irregularly spaced.

In one or more embodiments, one or more bristles 50 of the livestock grooming article 10 can be individual bristles that are not connected to one or more additional bristles. In one or more embodiments, the head 20 can include one or more rows of bristles 51, where two or more bristles 50 are connected together at the bases 56 of the bristles as shown in FIG. 6. The row of bristles 51 can be manufactured using any suitable technique or combination of techniques.

The bristles 50 can extend through the body 22 and beyond the second major surface 26 of the body 22 at any suitable angle relative to a normal to the second major surface. In one or more embodiments, one or more bristles 50 can extend from the second major surface 26 of the body 22 such that the bristle axis 58 of the one or more bristles is substantially orthogonal to the surface, i.e., an angle between the bristle axis of the one or more bristles and the normal to the second major surface is no greater than 10 degrees.

The bristles 50 can be disposed in the head 20 using any suitable technique or combination of techniques. For example, as illustrated in FIG. 7, each bristle 50 is disposed through the body 22 of the head 20 by inserting the bristle through the channel 30 disposed between the first major surface 24 and the second major surface 26 of the body. In one or more embodiments, a width of the channel 30 can be selected to be less than a width of the base 56 of each bristle 50 such that the bristle 50 does not slide completely through the body 22 and out of the head 20 through the second major surface 26 of the body 22. In such embodiments, each bristle 50 can be inserted into the body 22 of the head 20 through the first major surface 24 and into the channel 30 such that the tip 54 of the bristle and the elongated portion 52 extend from the second major surface 26 of the body. In embodiments where the bristles 50 are provided in one or more rows 51 as shown in FIG. 6, each row of bristles can be disposed in the body 22 of the head 20 by inserting each bristle of the row of bristles into a channel 30 through the first major surface 24 of the body such that the bristles extend beyond the second major surface 26 of the body.

Figure 4:
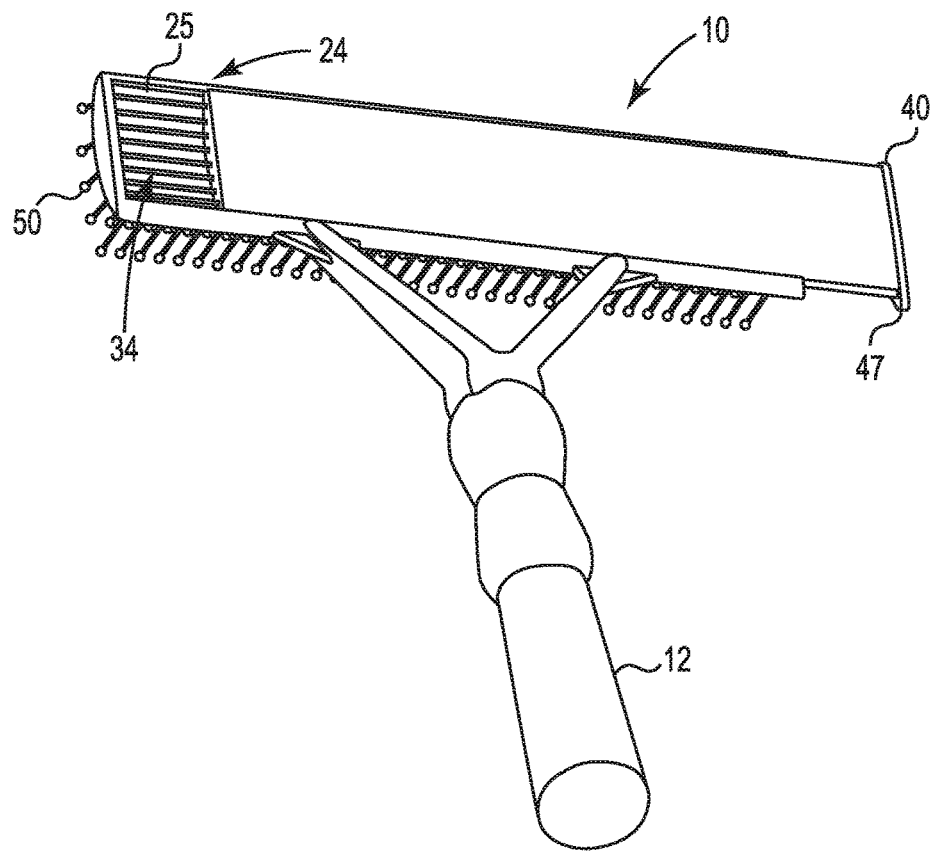
FIG. 4 is a schematic rear perspective view of the livestock grooming article of FIG. 2.
Figure 5:
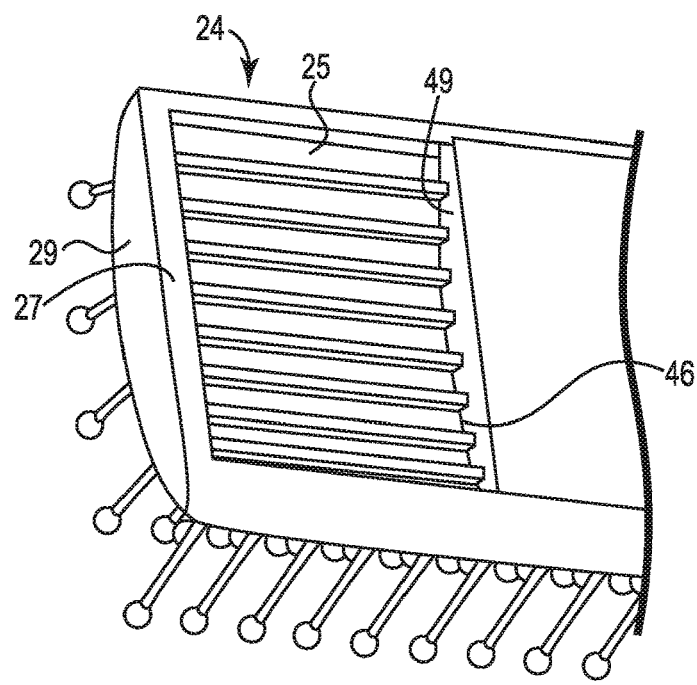
FIG. 5 is a schematic perspective view of a portion of the head of the livestock grooming article of FIG. 2.

Any suitable technique or combination of techniques can be utilized to hold the one or more bristles 50 in place. In one or more embodiments, the back 40 can be adapted to hold one or more bristles 50 in place when the back is connected to the first major surface 24 of the body 22 and the head 20 is in the closed configuration. In one or more embodiments, the first major surface 24 of the body 22 can include one or more grooves 25 that extend in a direction substantially parallel to the head axis 4 as shown in FIGS. 4-5. As used herein, the term "substantially parallel" means that a groove 25 extends along an axis that forms an angle with the head axis 4 of no greater than 10 degrees. Each groove 25 can include any suitable dimensions such that individual bristles 50 or rows of bristles 51 can be disposed within the groove and the bristles extend into channels 30 and beyond the second major surface 26 of the body 22. Further, in one or more embodiments, the back 40 can include one or more rails or tabs 46 (FIGS. 5 and 7) that coincide with the grooves 25 formed in the body 22. In such embodiments, the rails 46 of the back 40 can slidably engage the grooves 25 formed in the body 22 when the back is slid into the body.

The rails 46 of the back 40 can take any suitable shape and have any suitable dimensions. As can be seen in FIG. 7, the rails 46 can be adapted such that the rails engage the bases 56 of the bristles 50 and hold the bristles in place within the body 22 when the back 40 is connected to the body and the body is in the closed configuration. In other words, in one or more embodiments, the back 40 is adapted to hold the bristle 50 in place when the back is connected to the first major surface 24 of the body 22 of the head 20.

Livestock grooming article 10 can be manufactured using any suitable technique or combination of techniques. For example, livestock grooming article 10 can be assembled by forming the handle 12 using any suitable technique or combination of techniques. The body 22 of the head 20 can be connected to the handle 12 using any suitable technique or combination of techniques. In one or more embodiments, the handle 12 and body 22 can be integrally formed. One or more channels 30 can be formed through the body 22 using any suitable technique or combination of techniques such that the channel extends between the first major surface 24 of the body and the second major surface 26. One or more bristles 50 can be inserted through one or more channels 30 such that the bristles extend through the body 22 and beyond the second major surface 26 of the body. In one or more embodiments where the article 10 includes a plurality of bristles that are attached to a common base (e.g., row of bristles 51 of FIG. 6) and the body includes a plurality of channels 30, each bristle of the plurality of bristles can be inserted through a channel of the plurality of channels such that the bristles extend through the body and beyond the second major surface 26 of the body. And the back 40 can be connected to the first major surface 24 of the body 22. In one or more embodiments, the back 40 can be slidably connected to the first major surface 24 of the body using any suitable technique or combination of techniques. The back 40 can be connected to the head 20 and permanently attached using any suitable technique or combination of techniques, e.g., adhesives, mechanical fasteners, melt bonding, etc. In one or more embodiments, the back 40 can remain slidably connected to the head 20 such that the back can be removed to replace one or more of the bristles 50.

One or more embodiments of the livestock grooming article 10 described herein can advantageously allow for the replacement of one or more of the bristles 50 if such bristles become broken or rendered unusable. For example, one or more bristles 50 can be removed from the head 20 by at least partially disconnecting the back 40 from the first major surface 24 of the body 22, e.g., by sliding the back along the head axis 4. One or more replacement bristles 50 can be disposed through one or more channels 30 such that the bristles extend through the body 22 and beyond the second major surface 26. The back 40 can then be reconnected to the body 22 of the head 20 by, e.g., sliding the back into the body until the first end 47 of the back is adjacent to or in contact with the first end 28 of the body.

All references and publications cited herein are expressly incorporated herein by reference in their entirety into this disclosure, except to the extent they may directly contradict this disclosure. Illustrative embodiments of this disclosure are discussed and reference has been made to possible variations within the scope of this disclosure. These and other variations and modifications in the disclosure will be apparent to those skilled in the art without departing from the scope of the disclosure, and it should be understood that this disclosure is not limited to the illustrative embodiments set forth herein. Accordingly, the disclosure is to be limited only by the claims provided below.

What is claimed is:
1. A livestock grooming article, comprising:
a handle extending along a handle axis; and
a head extending along a head axis that is substantially orthogonal to the handle axis, the head connected to the handle, wherein the head comprises:
   a body comprising a first major surface and a second major surface, wherein the first major surface comprises a groove extending substantially parallel to the head axis;
   a back slidably connected to the first major surface of the body, wherein the back comprises a first major surface and a second major surface, wherein the first major surface of the back faces the first major surface of the body when the back is connected to the head; and a bristle disposed within the groove and extending through the body and beyond the second major surface of the body;
wherein the groove is adapted to slidably receive a rail of the back disposed on the first major surface of the back.

2. The livestock grooming article of claim 1, wherein the head is adapted such that the bristle can be removed from the head when the back is at least partially removed from the body.

3. The livestock grooming article of claim 1, wherein the first major surface of the body further comprises a slot adapted to receive a tab disposed on an edge of the back.

4. The livestock grooming article of claim 1, wherein the body further comprises a channel that extends between the first major surface and the second major surface of the body, wherein the channel is adapted to receive the bristle such that the bristle extends through the body.

5. The livestock grooming article of claim 1, wherein the bristle comprises a base, a tip, and an elongate portion extending between the base and the tip along an undeflected bristle axis.

6. The livestock grooming article of claim 5, wherein the tip of the bristle comprises a rounded surface.

7. The livestock grooming article of claim 5, wherein the tip of the bristle comprises a ball tip.

8. The livestock grooming article of claim 5, wherein the back is adapted to hold the bristle in place when the back is connected to the first major surface of the body of the head and the head is in a closed configuration.

9. The livestock grooming article of claim 8, wherein the back is adapted to engage the base of the bristle when the back is connected to the first major surface of the body of the head and the head is in the closed configuration.

10. The livestock grooming article of claim 1, wherein the second major surface of the body of the head is curved in a plane normal to the head axis.

11. The livestock grooming article of claim 1, wherein the first major surface of the head comprises a cavity adapted to slidably receive the back.

12. The livestock grooming article of claim 1, wherein the second major surface of the back comprises a curved shape in a plane orthogonal to the head axis when the back is connected to the first major surface of the body.

13. The livestock grooming article of claim 1, wherein the bristle comprises a plurality of bristles connected to a common base, wherein each bristle of the plurality of bristles extends through the body and beyond the second major surface of the body.

14. The livestock grooming article of claim 1, wherein the back is slidably connected to the head in a direction parallel to the head axis.

15. A method of forming a livestock grooming article, comprising:
    forming a handle that extends along a handle axis;
    connecting a head to the handle, wherein the head extends along a head axis that is substantially orthogonal to the handle axis;
    forming a groove in a first major surface of a body of the head, wherein the groove extends substantially parallel to the head axis;
    forming a channel through the body of the head, wherein the channel extends between a first major surface of the body and a second major surface of the body;
    inserting a bristle through the groove and the channel such that the bristle extends through the body and beyond the second major surface of the body; and
    slidably connecting a back to the first major surface of the body in a direction parallel to the head axis, wherein slidably connecting the back comprises slidably engaging a rail formed in the back with the groove formed in the body.

16. The method of claim 15, wherein the bristle comprises a plurality of bristles connected to a common base, and wherein the channel of the body comprises a plurality of channels, each channel extending through the body between the first major surface and the second major surface, wherein inserting the bristle comprises inserting each bristle of the plurality of bristles through a channel of the plurality of channels such that the plurality of bristles extends through the body and beyond the second major surface of the body.

17. The method of claim 15, further comprising removing the bristle from the head, wherein removing the bristle comprises:
    at least partially removing the back from the first major surface of the body; and
    directing the bristle through the channel in a direction from the second major surface of the body to the first major surface of the body.

* * * * *